United States Patent
Zeng et al.

(10) Patent No.: US 10,139,833 B1
(45) Date of Patent: Nov. 27, 2018

(54) SIX-DIMENSIONAL POINT CLOUD SYSTEM FOR A VEHICLE

(71) Applicant: GM GLOBAL TECHNOLOGY OPERATIONS LLC, Detroit, MI (US)

(72) Inventors: Shuqing Zeng, Sterling Heights, MI (US); Igal Bilik, Rehovot (IL)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/597,994

(22) Filed: May 17, 2017

(51) Int. Cl.
*G05D 1/02* (2006.01)
*B60W 30/12* (2006.01)
*B60W 30/16* (2012.01)
*G01S 17/02* (2006.01)

(52) U.S. Cl.
CPC .......... *G05D 1/0274* (2013.01); *B60W 30/12* (2013.01); *B60W 30/16* (2013.01); *G01S 17/023* (2013.01); *G05D 1/0214* (2013.01); *G05D 1/0223* (2013.01); *G05D 1/0246* (2013.01); *G05D 1/0255* (2013.01); *B60T 2201/08* (2013.01)

(58) Field of Classification Search
CPC ..... B60W 30/12; B60W 30/16; G01S 17/023; G05D 1/0214; G05D 1/0223; G05D 1/0246; G05D 1/0255
USPC .......................................................... 701/23
See application file for complete search history.

*Primary Examiner* — Maceeh Anwari
(74) *Attorney, Agent, or Firm* — Lorenz & Kopf, LLP

(57) ABSTRACT

A six-dimensional point cloud system for a vehicle is provide which may, for example calculate, for each point in a point cloud, a three-dimensional velocity of the respective point in the point cloud, segment each point in the point cloud into one or more clusters of points, compute a kinematic state of each of the one or more clusters of points, determine an object type associated with each of the one or more cluster, and determine a threat level and a response command based upon the determined object type and the kinematic state of each of the one or more clusters of points.

14 Claims, 3 Drawing Sheets

SIX-DIMENSIONAL POINT CLOUD SYSTEM FOR A VEHICLE

INTRODUCTION

The technical field generally relates to vehicles, and more particularly relates to systems and methods for operating radar system in a vehicle.

Vehicles often utilize various sensors and systems to detect the environment around the vehicle in order to navigate the vehicle, in the case of a self-driving vehicle, or aid a driver in navigating through a driving environment. In general, most current sensors and systems are more effective in more predictable environments, such as driving along a highway. In contrast, urban environments, such as city driving, are more difficult for to navigate as there more variables that the vehicle would have to consider.

Accordingly, it is desirable to include a sensor system in a vehicle capable of accurately identifying objects and tracking objects in both urban and highway environments. Furthermore, other desirable features and characteristics of the present invention will become apparent from the subsequent detailed description of the invention and the appended claims, taken in conjunction with the accompanying drawings and the background of the invention.

SUMMARY

In one embodiment, for example, a six-dimensional point cloud system for a vehicle is provided. The system may include, but is not limited to, a multiple input multiple output radar system, a memory, and a processor communicatively connected to the multiple input multiple output radar system and the memory, the processor configured to receive, from the multiple input multiple output radar system, a current data frame comprising a point cloud, the point cloud including three-dimensional position information and Doppler data corresponding to an object detected by the multiple input multiple output radar system at each point in the point cloud, calculate, for each point in the point cloud, a three-dimensional velocity of the respective point in the point cloud based upon the three-dimensional position information and Doppler data associated with the point in the current data frame and data from a previous data frame stored in them memory, segment each point in the point cloud into one or more clusters of points based upon the three-dimensional position information associated with each respective point and the calculated three-dimensional velocity of each respective point, compute a kinematic state of each of the one or more clusters of points, the kinematic state including a center of mass for the respective cluster of points, a reference velocity for the respective cluster of points, an angular velocity for the respective cluster of points, and contour points for the respective cluster of points, determine an object type associated with each of the one or more cluster, and determine a threat level and a response command based upon the determined object type and the kinematic state of each of the one or more clusters of points.

In another embodiment, for example, a method for operating a six-dimensional point cloud system for a vehicle, is provided. The method may include, but is not limited to, receiving, by a processor from a multiple input multiple output radar system, a current data frame comprising a point cloud, the point cloud including three-dimensional position information and Doppler data corresponding to an object detected by the multiple input multiple output radar system at each point in the point cloud, calculating, by the processor for each point in the point cloud, a three-dimensional velocity of the respective point in the point cloud based upon the three-dimensional position information and Doppler data associated with the point in the current data frame and data from a previous data frame stored in a memory, segmenting, by the processor, each point in the point cloud into one or more clusters of points based upon the three-dimensional position information associated with each respective point and the calculated three-dimensional velocity of each respective point, computing, by the processor, a kinematic state of each of the one or more clusters of points, the kinematic state including a center of mass for the respective cluster of points, a reference velocity for the respective cluster of points, an angular velocity for the respective cluster of points, and contour points for the respective cluster of points, determining, by the processor, an object type associated with each of the one or more cluster, and determining, by the processor, a threat level and a response command based upon the determined object type and the kinematic state of each of the one or more clusters of points.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description.

As discussed above, city environments are a challenging environment for a vehicle to navigate due to the large number of variable situations the vehicle can encounter. Accordingly, as discussed in further detail below, a six-dimensional point cloud system is provided which utilizes a multiple input multiple output radar system for accurately identifying and tracking objects around a vehicle in both urban and highway environments.

Figure 1:
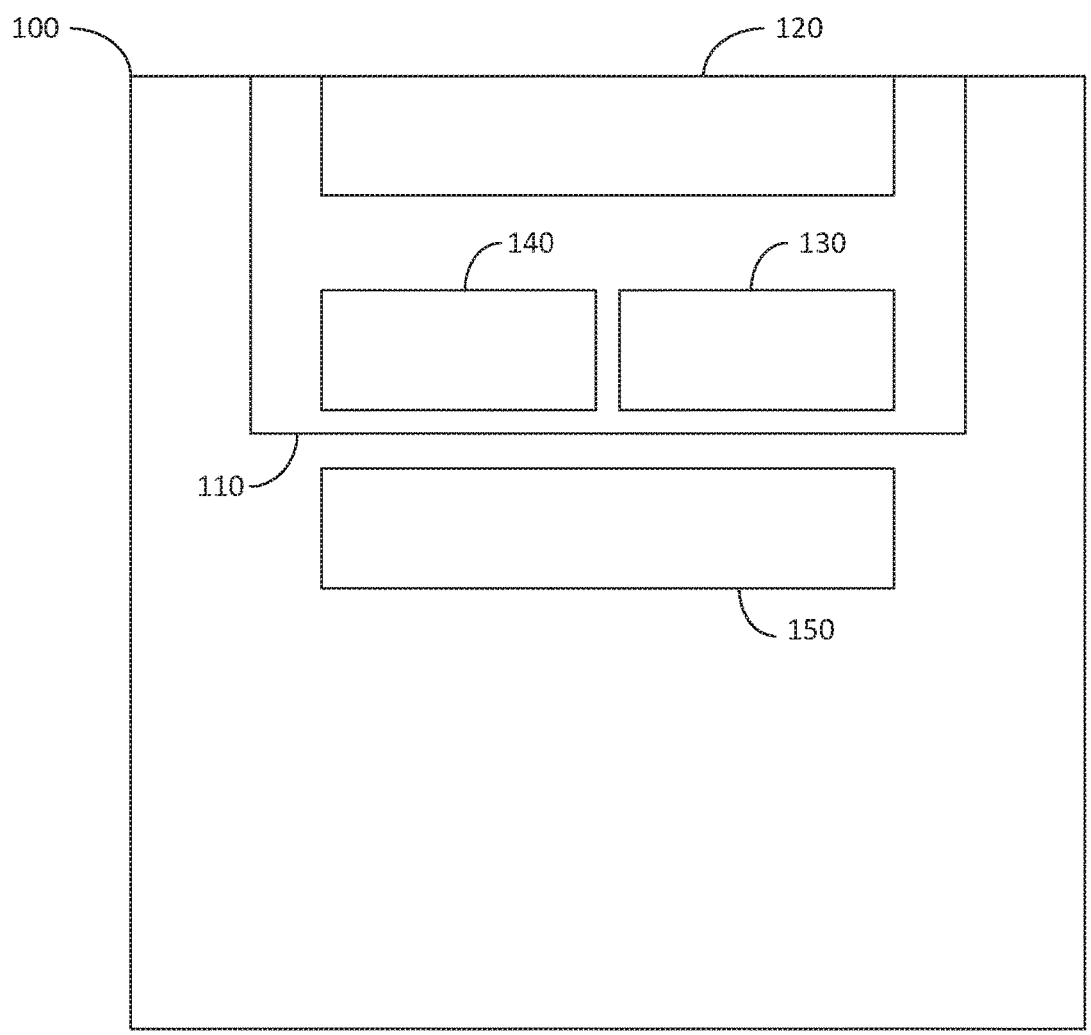
FIG. 1 is a block diagram of a vehicle, in accordance with an embodiment.

FIG. 1 is a block diagram of a vehicle 100, in accordance with an embodiment. In one embodiment, for example, the vehicle 100 may be an automobile. However, in other embodiments, the vehicle 100 may be, for example, an aircraft, a spacecraft, a watercraft or the like, or any combination thereof.

The vehicle 100 includes a six-dimensional (6D) point cloud system 110. The 6D point cloud system 110 generates three-dimensional (3D) velocity data and 3D position data for objects to accurately identify an object near the vehicle and to accurately track the object, as discussed in further detail below. The objects may be, for example, another vehicle, a motorcycle, a bicycle, a pedestrian, a street light, a street sign, construction/warning objects (e.g., barricades, cones, drums, etc.), or the like.

The 6D point cloud system 110 includes a multiple input multiple output (MIMO) radar system 120. The MIMO radar system 120 may include a single, or multiple co-located or distributed antenna that is capable of simultaneous transmitting and receiving multiple frequencies of radar signals in the same field of view. Accordingly, the MIMO radar system 120 is capable of generating a dense point cloud of data. Every time an object reflects the radar signal a point in the point cloud is created. The number of points on the point cloud that correspond to a single object can vary depending upon the size of the object and the distance of the object from the vehicle. As discussed in further detail below, the MIMO radar system 120 outputs a multiple data points for each point in the point cloud which the 6D point cloud system 110 utilizes to identify and track objects.

The 6D point cloud system 110 further includes at least one processor 130. The at least one processor 130 may be a central processing unit (CPU), a graphics processing unit (GPU), a physics processing unit (PPU), an application specific integrated circuit (ASIC), a field programmable gate array (FPGA), a microcontroller, or any other logic device or any combination thereof. While the 6D point cloud system 110 may utilize multiple processors 130, the at least one processor 130 hereinafter is referred to as a singular processor 130 for simplicity.

The 6D point cloud system 110 further includes a memory 140. The memory may be any combination of volatile and non-volatile memory. The memory 140 may store frames of data from the MIMO radar system 120 for processing, as discussed in further detail below. The memory 140 may also store non-transitory computer readable instructions for implementing the 6D point cloud system 110 as discussed herein.

The vehicle 100 further includes at least one control system 150 which can be controlled by the 6D point cloud system 110. The control system 150 may be, for example, a braking system, an acceleration system, a steering system, a lighting system, or the like. When the 6D point cloud system 110 identifies an object which may impact or come near the vehicle 100, the 6D point cloud system 110 may generate a control signal to activate the control system to generate a warning, avoid the object or minimize an impact with the object.

Figure 2:
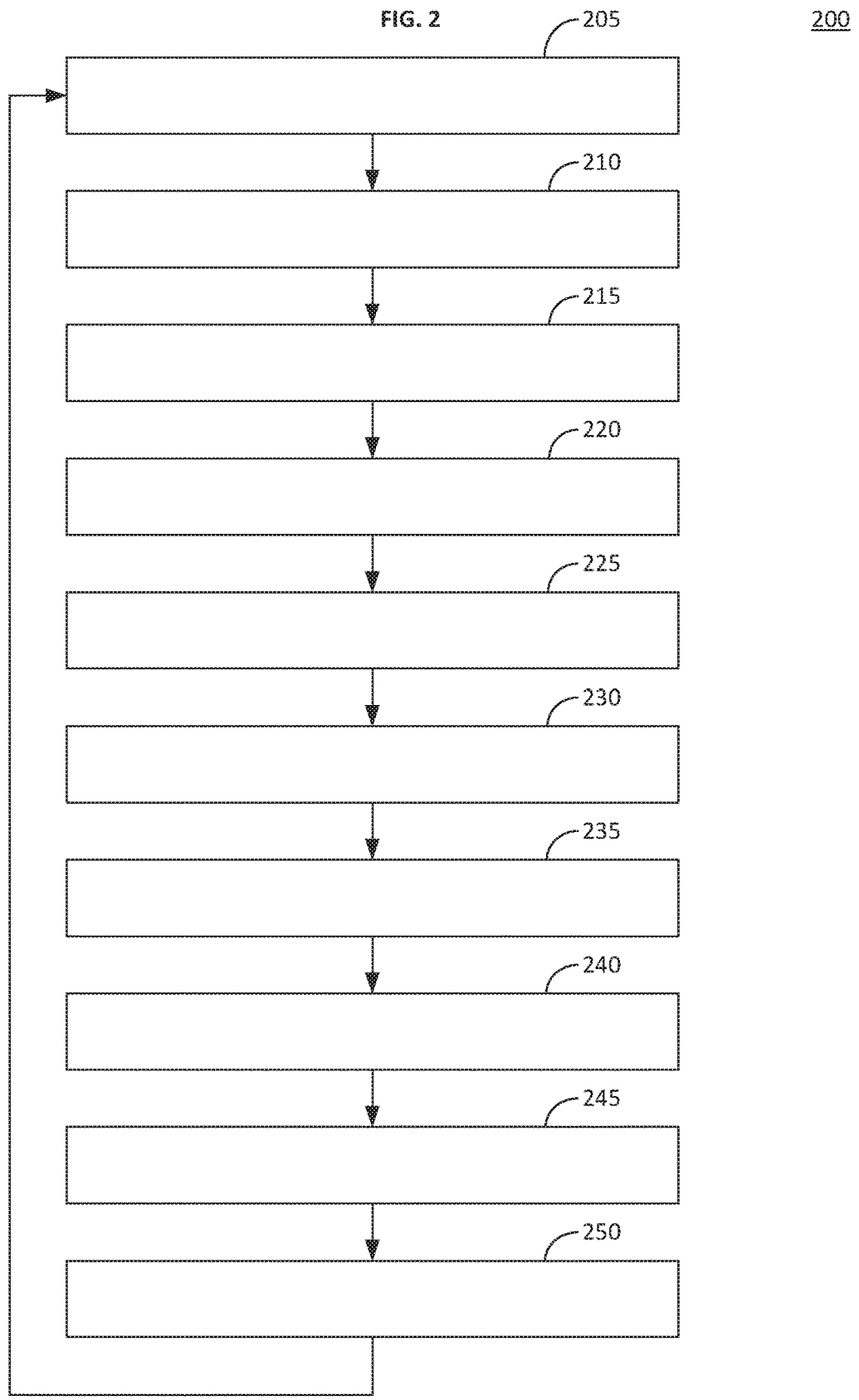
FIG. 2 is a flow diagram illustrated an exemplary method for operating the 6D point cloud system, in accordance with an embodiment.

FIG. 2 is a flow diagram illustrated an exemplary method 200 for operating the 6D point cloud system 120, in accordance with an embodiment. The processor 130 receives a data frame from the MIMO radar system 120. (Step 205). The data frame includes data for each data point in the point cloud of the radar image at a point in time. The data frame includes four data points for each data point in the point cloud. The four data points include three location data points and a Doppler data point. The intensity data point may be generated based upon one or more of the four data points. For example, an intensity may be based upon a signal strength of the received location or Doppler data points. In one embodiment, for example, the radar may output the three location data points as a range, and azimuth angle and elevation angle relative to the location of the MIMO radar system 120. In another embodiment, for example, the radar may output the three location data points as Cartesian coordinates (i.e., X, Y and Z).

The intensity data point may be measured in, for example, watts, decibels, range in meters, velocity in meters per second, Doppler in Hz, angles in degrees, or the like. The Doppler data point includes a range and a range rate. In other words, the Doppler data point includes data corresponding to whether a point in the point cloud, which corresponds to an object, is getting closer to or further from the vehicle 100 as well as the distance from the vehicle 100.

Figure 3:
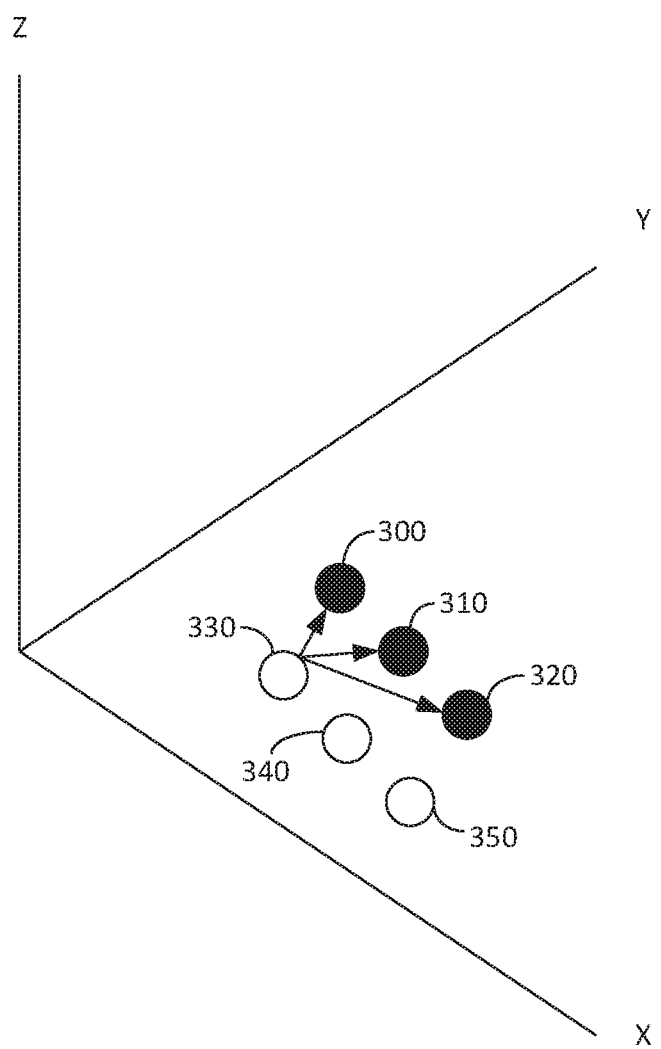
FIG. 3 illustrates data points in a current data frame and a previous data frame in an exemplary Cartesian coordinate system.

The processor 130 then computes an estimated three-dimensional velocity for each data point in the point cloud where an object was detected by the MIMO radar system 120. (Step 210). In order to determine the estimated three-dimensional velocity for each data point in the point cloud, the processor 130 must determine which point in the point cloud corresponds to which point in the point cloud of a previous data frame. FIG. 3 illustrates data points in a current data frame and a previous data frame in an exemplary Cartesian coordinate system. In this example, the circles 300, 310 and 320 correspond to points in a point cloud in previous data frame and the solid circles 330, 340 and 350 correspond to points in a point cloud in the current data frame. In order to determine the velocity for point 330, the processor 130 must determine which of the points 300-320 the point 330 corresponds to in the previous data frame and then use the relative distance between the determined point and point 330 to determine the velocity of the point 330. In one embodiment, for example, the processor may simultaneously determine both the corresponding point in the previous frame for each point in the current frame and the velocity of the each point in the current frame according to Equation 1:

$$v'_k = \operatorname{argmin}_{v_k} \sum_{j}^{N_k} \left( a_{jk} \left( \frac{(\|s_k - (m_j + v_k \Delta t)\|)^2}{\sigma_1^2} \right) + \left( \frac{(\|d_k - (v_k \cdot n_k)\|)^2}{\sigma_2^2} \right) \right) \quad \text{Equation 1}$$

Accordingly, the processor 130 determines the three-dimensional velocity $v_k$ for each point k in the point cloud of the current frame by determining the minimum velocity $v_k$ (i.e., $\operatorname{argmin}_{v_k}$) between the respective point in the point cloud of the current data frame and every point in the point cloud of the previous frame. In Equation 1, $s_k$ is the multi-dimensional location data received from the MIMO radar system 120 (i.e., the three location points discussed above) for the point k in the current data frame for which the velocity is being determined for, $m_j$ is the location data from one of the points in the point cloud of the previous frame, $d_k$ is the Doppler measurement for the point in the current frame (i.e., the Doppler measurement for $s_k$), $n_k$ is the unit direction from the center of the MIMO radar system 120 to the point $s_k$, $\sigma_1$ and $\sigma_2$ are calibration parameters, $N_k$ is the number of radar reflection points in current time frame matches with a point $m_j$ detected in previous time frame, and $a_{jk}$ is the probability that $m_j$ and $s_k$ are associated. In one embodiment, for example, $a_{jk}$ may be calculated according to Equation 2:

$$a_{jk} = ce^{\frac{(\|s_k - (m_j + v_k \Delta t)\|)^2}{\sigma_1^2}} \cdot e^{\frac{(\|d_k - d_j\|)^2}{\sigma_2^2}} \cdot e^{\frac{(\|I_k - I_j\|)^2}{\sigma_3^2}} \quad \text{Equation 2}$$

where $I_k$ is an intensity value for the point $s_k$, $I_j$ is an intensity value for the point $m_j$, and c is a normalization factor such that a sum of all $a_{jk}$ is equal to 1. In other words, c is a normalization factor such that a sum of all the probabilities that any given point in the point cloud of the previous data frame corresponds to the point $s_k$ in the point cloud of the current data frame. In equations 1 and 2 Δt is the difference in time between the respective data frames and $\sigma_1$, $\sigma_2$ and $\sigma_3$ are calibration parameters are the standard deviation of position measurement, Doppler measurement, and intensity measurement of a calibrated target (e.g., corner reflector), respectively. The processor 130, when performing the calculations for Equations 1 and 2, may initially set the velocity $v_k$ of $s_k$ as $\Sigma_j^{N_k} a_{jk} \cdot v_j$. In other words, the velocity $v_k$ of $s_k$ is assumed to be a sum of the probability each respective point in the point cloud of the previous frame corresponds to the point $s_k$ in the current frame multiplied by the velocity of the respective point in the point cloud of the previous frame determined in the previous three-dimensional velocity calculation (i.e., $v_k$ for the point in the point cloud of the previous frame determined in a previous calculation).

Returning to FIG. 2, the processor 130 then removes noisy resolution points from the data frame (Step 215). In one embodiment, for example, the processor 130 may remove data points from subsequent calculations based upon temporal persistency. In other words, points in a current point cloud which could not be correlated with points in a previous point cloud are not considered in any subsequent calculations.

The processor 130 then classifies each point in the point cloud of the current frame as stationary or dynamic. (Step 220). A point in a point cloud is assumed to be stationary when an estimated relative velocity for the point is below a predetermined threshold. The threshold may be, for example, ten decibels (dB) above a noise level. The processor 130 determines the relative velocity of each point in the point cloud of the current frame by comparing the velocity of the point to the vehicle spend after compensating the velocity $v_k$ for the point (determined in Step 215) with the yaw, pitch and roll of the vehicle and compensating the position of the point (i.e., the three location points from MIMO radar system 120) based upon a position of the MIMO radar system 120 as well as the yaw, pitch and roll of the vehicle. In one embodiment, for example, the processor may determine a classification for each point in the point cloud based upon Equation 3:

$$\|R \cdot v_k + (\omega_H \cdot R \cdot s_k + V_H)\| < \varepsilon \quad \text{Equation 3}$$

where $v_k$ is the velocity of the point in the current data frame, $\omega_H$ is a pitch rate of the vehicle 100, $s_k$ is the position of the point in the current data frame, $V_H$ Is the speed of the vehicle 100 and R is a rotational matrix that compensates the velocity $v_k$ and position $s_k$ for the yaw, pitch and roll of the vehicle 100. In one embodiment, for example, the rotational matrix R may be calculated according to Equation 4:

$$R = \quad \text{Equation 4}$$
$$R_z(\psi)R_y(\theta)R_x(\phi) = \begin{pmatrix} c_\theta c_\psi & c_\psi s_\phi s_\theta - c_\phi s_\psi & s_\phi s_\psi + c_\phi c_\psi s_\theta \\ c_\theta s_\psi & c_\phi c_\psi + s_\phi s_\theta s_\psi & -c_\psi s_\phi + c_\phi s_\theta s_\psi \\ -s_\theta & c_\theta s_\phi & c_\phi c_\theta \end{pmatrix}$$

where $\psi$ is a yaw of the vehicle 100, $\theta$ is a pitch of the vehicle 100, $\Phi$ is a roll of the vehicle, c represents a cosine function (i.e., $c_\theta = \cos(\theta)$) and s represents a sin function (i.e., $s_\Phi = \sin(\Phi)$).

In equation 3 $\varepsilon$ represents a predetermined stationary speed. In one embodiment, for example, $\varepsilon$ may be less than 0.5 kilometers per hour (KPH). Accordingly, if the norm of the sum of the velocities represented on the left side of Equation 3 is less than $\varepsilon$, the processor 130 classifies the point in the point cloud as stationary. However, if the norm of the sum of the velocities represented on the left side of Equation 3 is greater than $\varepsilon$, the processor classifies the point in the point cloud as dynamic. The processor 130, in Step 220 performs this classification for every point in the point cloud of the current data frame.

In one embodiment, for example, the processor 130 may analyze the points in the point cloud classified as stationary to correct a radar angle alignment. (Step 225). In other words, the processor 130 may analyze the points in the point cloud classified as stationary determine if the angle of the MIMO radar system 120 has become misaligned from an intended angle. The misalignment could be from an impact to the vehicle 100 or from installation tolerances during installation of the MIMO radar system 120.

Consider a stationary radar point $s_k$, we have $R v_k = u_k$, $u_k = -(\omega_H \times p_k + v_H)$, for k=1, ..., K. Let $\alpha = [v_1 \ldots v_K]$, and $\beta = [u_1 \ldots u_K]$. The $\alpha$ and $\beta$ may include radar points from current and past time frames, for example, within 1 hour. The unknown rotation matrix R of the radar referring to the vehicle frame is equal to $UCV^T$ and C is the matrix:

$$C = \begin{pmatrix} 1 & 0 & 0 \\ 0 & 1 & 0 \\ 0 & 0 & \det(UV^T) \end{pmatrix}$$

The $\det(UV^T)$ is the determinant of the matrix $UV^T$. U is the left orthogonal matrix and V is the right orthogonal matrix of the singular value decomposition (svd) of the matrix $\beta^T \alpha$.

A pitch correction $\theta$, a roll correction $\Phi$, and an azimuth correction $\psi$ for the radar angle alignment may be calculated according to Equations 5, 6, and 7:

$$\theta = -\arcsin(R(1, 3)) \quad \text{Equation 5}$$

$$\phi = \arcsin\left(\frac{R(2, 3)}{\cos(\theta)}\right) \quad \text{Equation 6}$$

$$\psi = \arctan2(R(1, 2), R(1, 1)) \quad \text{Equation 7}$$

Where 1, 2, and 3 refer to coordinates in the a matrix R. The calculated pitch correction $\theta$, a roll correction $\Phi$, and an azimuth correction $\psi$ may then be used to correct subsequent radar data input by compensating subsequent radar data input by the calculated pitch correction $\theta$, roll correction $\Phi$, and azimuth correction $\psi$.

Matrices $\alpha$ and $\beta$ needn't to be stored, since $\alpha \beta^T$ can be recursively computed. For example, in case of deleting a sample $(v_1, u_1)$ and adding a sample $(v_{K+1}, u_{K+1})$, the new $\alpha' \beta'^T$ is computed as $\alpha' \beta'^T = \alpha \beta^T - v_1 u_1^T + v_{K+1} u_{K+1}^T$.

The processor 130 may then segment the points in the point cloud from the current frame into clusters (Step 230). Any two points of the point cloud may be clustered in the same cluster according to Equation 8:

$$\frac{\|p_k - p_j\|}{\sigma_1^2} + \frac{\|u_k - u_j\|}{\sigma_2^2} \leq 1 \quad \text{Equation 8}$$

In other words, when the difference between the three dimensional position of two points j and k in the point cloud, divided by $\sigma_1^2$ which is a varience in the position pk–pj added to the difference between the three dimensional velocity of the two points j and k, divided by $\sigma_2^2$ which is a varience in the velocity data uk−uj, is less than one, than the processor 130 associates the points j and k into the same cluster. As discussed above, the three dimensional velocity for a point k can be calculated according to Equation 1. The three dimensional position is determined based upon the data from the MIMO radar system 120.

The processor 130 may then compute a kinematic state for each cluster. (Step 235). The kinematic state may include, for example, a center of mass for the cluster, a reference velocity and angular velocity for the cluster and contour points for the cluster. The contour of the cluster corresponds to an outline of the cluster. The center of mass $p_{cm}$ of the cluster may be determined by the processor 130 according to Equation 9:

$$p_{cm} = \sum_{k=1}^{c} \frac{p_k}{C} \quad \text{Equation 9}$$

In Equation 9, C corresponds to the number of points in the cluster and $p_k$ corresponds to the position of each point in the cluster. The processor 130 may then determine the reference velocity $u_{ref}$ and a reference angular velocity $\omega_{ref}$ according to Equation 10:

$$\mathrm{argmin}_{u_{ref},\omega_{ref}} \sum_{k=1}^{c} \|u_k - \omega*(p_k - p_{cm})\|^2 \quad \text{Equation 10}$$

Where $\omega$ is the radial frequency $2\pi f$. The radial frequency is a function of target velocity and the measured frequency shift induced by target motion. The processor 130 may determine the contour points according to $p_k-p_{cm}$ for each point k=1, 2, . . . C in the cluster. In other words, the processor 130 determines a contour point for each point in the cluster corresponding to the difference in the three-dimensional position of each respective point k in the cluster and the three-dimensional position of the center of mass for the cluster.

In one embodiment, for example, the processor 130 may use a Kalman filter on the kinematic state data (i.e., the center of mass for the cluster, the reference velocity, the reference angular velocity, and the contour points for the cluster) to track and report a smoothed kinematic state for the cluster over multiple radar data frames. One benefit of using the Kalman filter over multiple frames is that any anomalies in the kinematic state data are averaged out.

The processor 130 may than classify an object to be associated with each cluster. (Step 240). In other words, the processor 130 determines an object type for the cluster. A cluster may be classified, for example, as a vehicle, a pedestrian, a barricade, a street light, a stop sign, or any other object a vehicle could encounter on the road. In one embodiment, for example, a deep learning neural network (DLNN) may perform the object classification. As the object classification is a complex process, a separate processor 130, such as a GPU or an array of FPGA's may be used on this process alone. However, as discussed above, the number of processors 130 in the 6D point cloud system 110 may vary depending upon a performance level of the processor and the desired response time of the 6D point cloud system 110.

The processor 130 may input a normalized intensity map and a time sliding window of micro-Doppler signals to the DLNN for each cluster. As discussed above, the MIMO radar system 120 may output an intensity associated with each data point. The normalized intensity map is created by dividing the intensity values by the total number of values. The time sliding window of micro-Doppler signals corresponds to a frequency in hertz received by the MIMO radar system 120 corresponding to the cluster over a period of data frames. The DLNN creates feature maps for each cluster by extracting features from the intensity map and the time sliding window of micro-Doppler signals.

The processor 130 classifies a cluster based upon the reference velocity associated with the cluster and the contour of the cluster. Each type of target, for example, a pedestrian or a vehicle, has a typical micro-Doppler signature, and thus when analyzing the spectrogram (i.e., a spectrum change over time corresponding to the target), the processor 130 can classify the target based upon which signature the target most closely resembles.

The processor 130 then tracks each classified cluster in subsequent passes through the process. (Step 245). Each objet (e.g., vehicle, pedestrian, etc.) has multiple detection points in the point cloud. Accordingly, the processor 130 does not need to track each detection point individually, but rather the group of points clustered together to represent an object. On each subsequent pass through the method 200, the processor 130 tracks a change in the center of the cluster and parameters (e.g., position and velocity) of the cluster. The updated center and other parameters are used in subsequent threat level determinations.

The processor 130 then determines a threat level based upon the kinematic state data for the object determined in Steps 235 and 245 (i.e., the center of mass, reference velocity, reference angular velocity and contour), the object type determined in Step 235 and the object size (i.e., the number of points in the point cloud corresponding to the object) and response commands. (Step 250). The response commands may include generating a command for a vehicle control system 150 to avoid an object, to minimize an impact with the object to warn an object, or the like. The command may be, for example, to brake, accelerate, steer, flash lights, or the like, based upon the cluster velocity and the cluster proximity.

One benefit of the 6D point cloud system 110 is that by generating a 6D point cloud from the four-dimensional data received from the MIMO radar system 120, the 6D point cloud system 110 can accurately identify and track objects in an urban environment using a small sensor array.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A vehicle, comprising:
   at least one control system configured to control the vehicle; and
   a six-dimensional point cloud system, comprising:
      a multiple input multiple output radar system;

a memory; and a processor communicatively connected to the multiple input multiple output radar system and the memory, the processor configured to:

receive, from the multiple input multiple output radar system, a current data frame comprising a point cloud, the point cloud including three-dimensional position information and Doppler data corresponding to an object detected by the multiple input multiple output radar system at each point in the point cloud;

calculate, for each point in the point cloud, a three-dimensional velocity of the respective point in the point cloud based upon the three-dimensional position information and Doppler data associated with the point in the current data frame and data from a previous data frame stored in them memory;

segment each point in the point cloud into one or more clusters of points based upon the three-dimensional position information associated with each respective point and the calculated three-dimensional velocity of each respective point;

compute a kinematic state of each of the one or more clusters of points, the kinematic state including a center of mass for the respective cluster of points, a reference velocity for the respective cluster of points, an angular velocity for the respective cluster of points, and contour points for the respective cluster of points;

determine an object type associated with each of the one or more cluster; and determine a threat level and a response command based upon the determined object type and the kinematic state of each of the one or more clusters of points, wherein the response command causes the at least one control system to control the vehicle.

2. The vehicle of claim 1, wherein the processor is further configured to classify each point in the point cloud as either stationary or dynamic based upon the three dimensional velocity of the respective point of the point cloud.

3. The vehicle of claim 1, wherein the processor is further configured to determine a misalignment angle of the multiple input multiple output radar system based upon data associated with one or more stationary points in the point cloud.

4. The vehicle of claim 1, wherein the processor is further configured to calculate the three-dimensional velocity v'k of each respective point k in the point cloud according to:

$$v'k = \mathrm{argmin}_{v_k} \sum_{j}^{Nk} \left( a_{jk} \left( \frac{(\|s_k - (m_j + v_k \Delta t)\|)^2}{\sigma_1^2} \right) + \left( \frac{(\|d_k - (v_k \cdot n_k)\|)^2}{\sigma_2^2} \right) \right)$$

where $m_j$ is the three-dimensional position of a respective point in the previous data frame, $s_k$ is the three-dimensional position of a respective point in the current data frame, $a_{jk}$ is a probability that $m_j$ and $s_k$ are associated, $v_k$ is the calculated three-dimensional velocity of the respective point in the current data frame, $\Delta t$ is a difference in time between the previous data frame and the current data frame, $d_k$ is the Doppler data for the point $s_k$, $n_k$ is a unit direction from a radar center to the point $s_k$, and $\sigma_1$ and $\sigma_2$ are normalization parameters.

5. The vehicle of claim 4, wherein the processor is configured to determine $a_{jk}$ according to:

$$a_{jk} = ce^{-\frac{(\|s_k - (m_j + v_k \Delta t)\|)^2}{\sigma_1^2}} \cdot e^{-\frac{(\|d_k - d_j\|)^2}{\sigma_2^2}} \cdot e^{-\frac{(\|I_k - I_j\|)^2}{\sigma_3^2}}$$

where c is a normalization factor, $d_j$ is the Doppler data for the point $m_j$, $I_k$ and $I_j$ are intensity values corresponding to $s_k$ and $m_j$ from the multiple input multiple output radar system, and $\sigma_3$ is a normalization parameter.

6. The vehicle of claim 1, wherein the processor is configured to segment each point in the point cloud into a respective cluster when a sum of:

$$\frac{\|p_k - p_j\|}{\sigma_1^2} + \frac{\|u_k - u_j\|}{\sigma_2^2}$$

is less than or equal to 1 for any first point and second point in the point cloud, where pk is the three-dimensional position of the first point, uk is the calculated three dimensional velocity of the first point, pj is the three-dimensional position of the second point, uj is the calculated three dimensional velocity of the second point and $\sigma_1$ and $\sigma_2$ are normalization parameters.

7. The vehicle of claim 1, wherein the processor is configured to determine the object type associated with the cluster through a deep learning neural network.

8. A method for operating a six-dimensional point cloud system for a vehicle, comprising:

receiving, by a processor from a multiple input multiple output radar system, a current data frame comprising a point cloud, the point cloud including three-dimensional position information and Doppler data corresponding to an object detected by the multiple input multiple output radar system at each point in the point cloud;

calculating, by the processor for each point in the point cloud, a three-dimensional velocity of the respective point in the point cloud based upon the three-dimensional position information and Doppler data associated with the point in the current data frame and data from a previous data frame stored in a memory;

segmenting, by the processor, each point in the point cloud into one or more clusters of points based upon the three-dimensional position information associated with each respective point and the calculated three-dimensional velocity of each respective point;

computing, by the processor, a kinematic state of each of the one or more clusters of points, the kinematic state including a center of mass for the respective cluster of points, a reference velocity for the respective cluster of points, an angular velocity for the respective cluster of points, and contour points for the respective cluster of points;

determining, by the processor, an object type associated with each of the one or more cluster;

determining, by the processor, a threat level and a response command based upon the determined object type and the kinematic state of each of the one or more clusters of points; and activating at least one control system configured to control the vehicle based upon the determined response command.

9. The method according to claim 8, further comprising classifying, by the processor, each point in the point cloud as either stationary or dynamic based upon the three dimensional velocity of the respective point of the point cloud.

10. The method according to claim 9, further comprising determining a misalignment angle of the multiple input multiple output radar system based upon data associated with one or more stationary points in the point cloud.

11. The method according to claim 8, further comprising calculating the three-dimensional velocity v'k of each respective point k in the point cloud according to:

$$v'k = \mathrm{argmin}_{v_k} \sum_{j}^{Nk} \left( a_{jk} \left( \frac{(\|s_k - (m_j + v_k \Delta t)\|)^2}{\sigma_1^2} \right) + \left( \frac{(\|d_k - (v_k \cdot n_k)\|)^2}{\sigma_2^2} \right) \right)$$

where $m_j$ is the three-dimensional position of a respective point in the previous data frame, $s_k$ is the three-dimensional position of a respective point in the current data frame, $a_{jk}$ is a probability that $m_j$ and $s_k$ are associated, $v_k$ is the calculated three-dimensional velocity of the respective point in the current data frame, $\Delta t$ is a difference in time between the previous data frame and the current data frame, $d_k$ is the Doppler data for the point $s_k$, $n_k$ is a unit direction from a radar center to the point $s_k$, and $\sigma_1$ and $\sigma_2$ are normalization parameters.

12. The method according to claim 11, further comprising determining $a_{jk}$ according to:

$$a_{jk} = ce^{\frac{(\|s_k - (m_j + v_k \Delta t)\|)^2}{\sigma_1^2}} \cdot e^{\frac{(\|d_k - d_j\|)^2}{\sigma_2^2}} \cdot e^{\frac{(\|I_k - I_j\|)^2}{\sigma_3^2}}$$

where c is a normalization factor, $d_j$ is the Doppler data for the point $m_j$, $I_k$ and $I_j$ are intensity values corresponding to $s_k$ and $m_j$ from the multiple input multiple output radar system, and $\sigma_3$ is a normalization parameter.

13. The method according to claim 8, further comprising segmenting, by the processor, each point in the point cloud into a respective cluster when a sum of:

$$\frac{\|p_k - p_j\|}{\sigma_1^2} + \frac{\|u_k - u_j\|}{\sigma_2^2}$$

is less than or equal to 1 for any first point and second point in the point cloud, where pk is the three-dimensional position of the first point, uk is the calculated three dimensional velocity of the first point, pj is the three-dimensional position of the second point, uj is the calculated three dimensional velocity of the second point and $\sigma_1$ and $\sigma_2$ are normalization parameters.

14. The method according to claim 8, further comprising determining, by the processor, the object type associated with the cluster through a deep learning neural network.

* * * * *